United States Patent

McKeigue et al.

Patent Number: 5,396,772
Date of Patent: Mar. 14, 1995

[54] ATMOSPHERIC GAS SEPARATION METHOD

[75] Inventors: Kevin McKeigue, New York; Ramachandran Krishnamurthy, Chestnut Ridge, both of N.Y.

[73] Assignee: The BOC Group, Inc., Murray Hill, N.J.

[21] Appl. No.: 209,851

[22] Filed: Mar. 11, 1994

[51] Int. Cl.$^6$ ............................................. F25J 3/04
[52] U.S. Cl. ............................................. 62/22; 62/36; 62/39; 261/94
[58] Field of Search .................................. 261/94–98; 62/22, 36

[56] References Cited

U.S. PATENT DOCUMENTS

| | | | |
|---|---|---|---|
| 4,838,913 | 6/1989 | Victor et al. | 62/22 |
| 4,994,098 | 2/1991 | Agrawal et al. | 62/22 |
| 5,019,144 | 5/1991 | Victor et al. | 62/22 |
| 5,019,145 | 5/1991 | Rohde et al. | 62/22 |
| 5,049,174 | 9/1991 | Thorogood et al. | 62/22 X |
| 5,076,823 | 12/1991 | Hansel et al. | 62/22 |
| 5,100,448 | 3/1992 | Lockett et al. | 62/24 |
| 5,197,296 | 3/1993 | Prosser et al. | 62/22 X |
| 5,237,823 | 8/1993 | Cheung et al. | 62/22 X |
| 5,289,688 | 3/1994 | Agrawal | 62/22 X |
| 5,311,744 | 5/1994 | Sweeney et al. | 62/22 |

*Primary Examiner*—Christopher Kilner
*Attorney, Agent, or Firm*—David M. Rosenblum; Larry R. Cassett

[57] ABSTRACT

A method of cryogenically separating a mixture of atmospheric gases within a distillation column system having at least one distillation column. In accordance with the method, liquid and gaseous phases of the mixture of atmospheric gases to be separated are countercurrently passed through structured packing. The column is operated with a pressure greater than 2 bars and with a vapor rate of the vapor phase that is less than a critical vapor rate at which the column floods and which varies with the liquid rate of the liquid phase. Minimum and critical vapor rates at which the column floods are set in accordance with experimentally derived data for maximum column utilization in terms of packing volume or column throughput. Additionally, separation performance in terms of HETP increases with the increase in pressure so that a lower than prior art height of structured packing can be used to obtain a particular separation.

10 Claims, 2 Drawing Sheets

ATMOSPHERIC GAS SEPARATION METHOD

BACKGROUND OF THE INVENTION

The present invention relates to a method of cryogenically separating a mixture of atmospheric gases within a distillation column system having one or more columns. More particularly, the present invention relates to such a method in which descending liquid and ascending gaseous phases of the mixture are contacted through the use of structured packing to effect the separation between components of the mixture of atmospheric gases.

Mixtures of atmospheric gases, that is mixtures of gases found in air or air itself, for example, nitrogen, oxygen, argon, and etc. are separated in a variety of cryogenic distillation systems that are optimized for production of desired atmospheric gas components. Typically air as a mixture of atmospheric gases is refined into its various constituents through the use of a cryogenic distillation column system in which the air is first compressed and purified and then is cooled to cryogenic temperatures that are at or near its dew point. The cooled air is introduced into a distillation column in which actual separation takes place. Upon introduction to the distillation column, the higher volatility components, for instance, nitrogen, boil before the lower volatility components such as oxygen to create an ascending gaseous phase. A portion of the ascending gaseous phase is condensed to reflux the column and thereby to originate a descending liquid phase. The descending liquid phase is contacted with the ascending gaseous phase through a variety of well known contacting elements so that the liquid phase becomes more concentrated in the lower volatility components while the ascending gaseous phase becomes ever more concentrated in the higher volatility components.

The distillation column system may include a single column to produce a gaseous nitrogen product or a series of columns to further refine the air and to produce nitrogen, oxygen and argon products. Further columns may be used to further separate and produce other components of the air.

The liquid-gas contacting elements that are used to contact descending liquid and ascending gaseous phases of the mixture can be provided by various packings, trays, plates and etc. Structured packing has become a popular liquid-gas contacting element for cryogenic separations of mixture of atmospheric gases due to be low pressure drop characteristics of such packings. This low pressure drop characteristic can be advantageously realized in lower energy costs, greater production, and etc. The disadvantage of structured packing is its high initial cost as compared with the cost of conventional plates and trays.

A long held belief in the prior art is that the performance of structured packing deteriorates within increased pressure. As will be discussed, the inventors herein have found that the performance of structured packing, can increase with increased pressure when the mixture to be separated is a mixture of atmospheric gases. This fact can be put to use in producing columns of higher capacity using lower volumes of structured packing than have been previously considered. The decrease in volume of the structured packing will decrease the capital expenditures involved in fabricating a distillation column.

SUMMARY OF THE INVENTION

The present invention relates to a method of cryogenically separating a mixture of atmospheric gases within a distillation column system having at least one distillation column. In accordance with the method, descending liquid and ascending gaseous phases of the mixture of atmospheric gases are formed within the at least one distillation column. The descending liquid and ascending gaseous phases of the mixture are contacted through a structured packing contained within at least one section of the at least one distillation column. It is appropriate to point out that the term, "section" of a distillation column, as used herein and in the claims means a region of a distillation column that is delineated between a feed and a draw or two feeds or draws to the column. The section of the distillation column will contain two or more elements of structured packing oriented at right angles to one another in a manner well known in the art and associated hardware such as support plates and liquid distributors. As a result of the passage of the phases through the structured packing, the descending liquid phase becomes ever more concentrated in lower volatility components of the mixture as it descends through the structured packing while the ascending gaseous phase becomes ever more concentrated in higher volatility components of the mixture as it ascends through the structured packing. This separation of components in accordance with their volatility thereby effects the cryogenic separation. The cryogenic distillation column system is operated so that the at least one section has a pressure of greater than about two bars absolute and a flow parameter either within a range of between about 0.01 and 0.1 or greater than about 0.1. The flow parameter $\Psi$ is equal to a quotient of $C_L$ divided by $C_v$ where $C_v$ is the vapor rate of the ascending vapor phase and $C_L$ is the liquid rate of the descending liquid phase. The cryogenic distillation column system is operated to have a vapor rate of less than a critical vapor rate at which at least one section of the distillation column floods and greater than a minimum vapor rate.

In one aspect of the present invention, the structured packing is constructed of corrugated sheet metal with a specific area within a range of between about 100 $m^2/m^3$ and about 450 $m^2/m^3$ and flow channels oriented at an angle of between about 30 degrees and about 45 degrees. In this regard, the orientation of flow channels is taken herein and in the claims with respect to the column axis which in most structured packing installations will be vertical. For such packing the minimum vapor rate will be equal to about $\exp[-0.0485(\ln\Psi)^2 - 0.595 \ln\Psi - 3.176 - 0.00169A]$, where A is the specific area of said structured packing, when $\Psi$ is within the range and to about $0.054e^{-0.00169A} \Psi^{-0.372}$ when $\Psi$ is greater than 0.1.

In another aspect of the present invention, the structured packing is constructed of corrugated sheet metal with a specific area within a range of between about 450 $m^2/m^3$ and about 1000 $m^2/m^3$ and flow channels oriented at an angle of between about 30 degrees and about 45 degrees. For such packing the minimum vapor rate will be equal to about $\exp[-0.0485(\ln\Psi)^2 - 0.595 \ln\Psi - 3.748 - 0.000421A]$, where A is the specific area of the structured packing, when $\Psi$ is within the range and to about $0.0305e^{-0.0004214A} \Psi^{-0.372}$ when $\Psi$ is greater than 0.1.

In yet another aspect of the present invention, the structured packing is constructed of corrugated sheet metal with a specific area within a range of between about 170 m²/m³ and about 250 m²/m³ and flow channels oriented at an angle of about 30 degrees or less. For such structured packing, the minimum vapor rate is equal to about $\exp[-0.0485(\ln\Psi)^2 - 0.595 \ln \Psi - 2.788 - 0.00236A]$, where A is the specific area of the structured packing, when $\Psi$ is within the range and to about $0.0795 e^{-0.002364\Psi} - 0.372$ when $\Psi$ is greater than 0.1.

In yet still another aspect of the present invention, the structured packing is constructed of corrugated sheet metal with a specific area within a range of between about 250 m²/m³ and about 1000 m²/m³ and flow channels oriented at an angle of about 30 degrees or less. For such structured packing the minimum vapor rate is equal to about $\exp[-0.0485(\ln\Psi)^2 - 0.595 \ln \Psi - 3.156 - 0.000893A]$, where A is the specific area of the structured packing, when $\Psi$ is within the range and to about $0.05515 e^{-0.000893A} \Psi - 0.372$ when $\Psi$ is greater than 0.1.

In a further aspect the present invention provides a method of cryogenically separating a mixture of atmospheric gases with a distillation column system having at least one column in which the at least one distillation column is operated at a pressure within a range of between about 3.5 bars and about 7.5 bars absolute. Descending liquid and ascending gaseous phases of the mixture of atmospheric gases are formed within the at least one distillation column. The descending liquid and ascending gaseous phases of the mixture are contacted through structured packing contained within at least one section of the at least one distillation column and having a packing density of about 750 m²/m³ and flow channels oriented at an angle of about 45 degrees. As a result of the contact, the descending liquid phase becomes ever more concentrated in lower volatility components of the mixture as it descends through the structured packing while the gaseous phase becomes ever more concentrated in higher volatility components of the mixture as it ascends through the structured packing, thereby to effect the cryogenic separation. The liquid and gaseous phases of the mixture of atmospheric gases are contacted through a height of the structured packing such that the liquid and gaseous phases respectively contain lower and high volatility components of the mixture in predetermined concentrations and the height of the structured packing is approximately equal to a product of a number of theoretical stages required to produce the predetermined concentrations of the lower and higher volatility components and a quantity equal to a sum of 0.181 and the pressure within the at least one column multiplied by −0.00864.

In a yet further aspect of the present invention, the at least one distillation column can be operated at a pressure within a range of between about 7.5 and about 20 bars absolute. In such case, the height of the structured packing through which the mixture of atmospheric gases will be contacted through is about equal to a product of the number of theoretical stages required to produce the predetermined concentration of the lower and higher volatility components and 0.116.

In the prior art, it was believed that performance of structured packing degraded at higher pressures. The applicants herein have found that the performance of structured packing is dependent upon the mixture being separated. To the extent that the mixture is a mixture of atmospheric gases, the performance of the structured packing within the distillation column can be found to actually increase with pressure. For instance, prior art data for structured packing having a density of 750 m²/m³ indicates an upper limit on its operating envelope given by the formula of $\exp[-4.064 - 0.595 \ln \Psi - 0.0485 (\ln \Psi^2]$. In the prior art, if any section of a distillation column is operated above this upper limit, the section will flood. This foregoing limit was obtained when the pressure was about 2 bars or less. Above about 2 bars, the prior art indicated that performance would deteriorate and that this upper limit could not be obtained.

Applicants have found that for structured packing fabricated of corrugated sheet metal and having a packing density of, for instance, 750 m²/m³, when the mixture to be separated contains atmospheric gases and when the pressure is above about 2 bars, that the foregoing prior art upper limit is not a bound of the operating envelope of such structured packing.

$C_v$, the vapor rate, as used herein and in the claims is the densimetric superficial gas velocity. This gas velocity is a product of the superficial gas velocity and the square root of the gas density divided by the liquid density minus the gas density. Superficial velocity is an average velocity through the column that is based on mass flow rate. Hence, if the column is operated above two bars and the mixture to be separated is an atmospheric gas mixture, then the mass flow rate through the column can be increased beyond that thought in the prior art. Alteratively, for a given mass flow rate requirement for a column, the column can be designed with a much thinner cross section and consequently a higher superficial velocity than would have been presupposed on the basis of prior art teachings in this area. The thinner cross sectional area of the column will result in the use of a lower volume of structured packing being used for a given application of the structured packing. Hence, a cost savings can be realized in the construction of a distillation column for given performance requirement for the distillation column. A further point is that at higher pressures, not only may the column be made thinner, but also shorter than would have been thought in the prior art. This is because the HETP or height equivalent to a theoretical plate decreases with increasing column pressure. Therefore, the present invention contemplates a two-dimensional savings in the volume of required structured packing for mixture of atmospheric gases.

It should be pointed out that as used herein and in the claims, all heights are in meters and all rates, such as liquid and vapor rates are in meters per second. Additionally, all pressures are in bars absolute and all specific areas are in square meters per cubic meter. A further point is that although many experiments were conducted with structured packing obtained from Sulzer Brothers Limited, the present invention would have equal applicability to structured packings obtained from other manufacturers.

BRIEF DESCRIPTION OF DRAWINGS

While the specification concludes with claims distinctly pointing out the subject matter that applicants regard as their invention, it is believed the invention would be better understood when taken in connection with the accompanying drawings in which:

DETAILED DESCRIPTION

Figure 1:
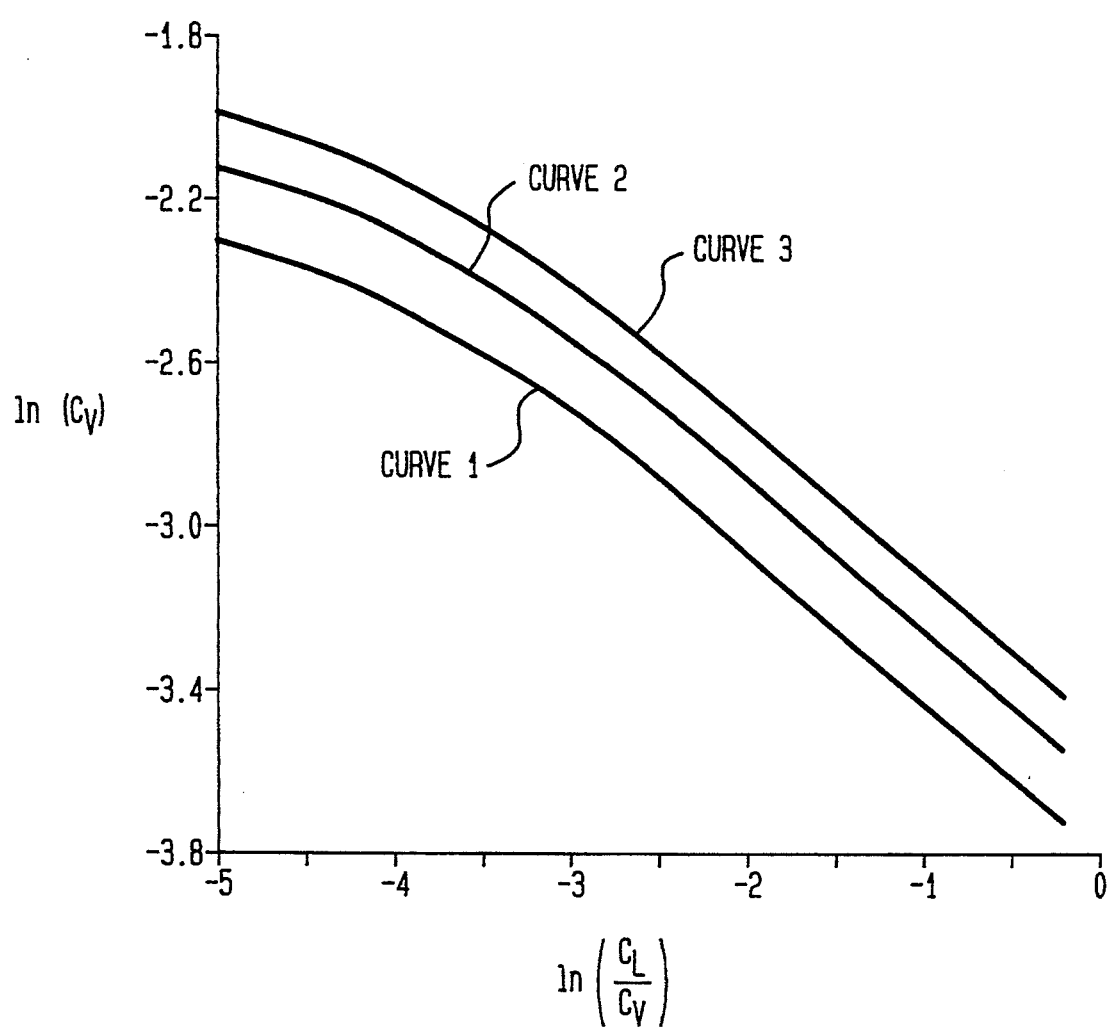
FIG. 1 is a Souders diagram for MELLAPAK 750.Y packing, obtained from Sulzer Brothers Limited, illustrating the prior art performance envelopes versus those utilized in the present invention.

With reference to FIG. 1, curve 1 represents a prior art Souders diagram of MELLAPAK 750.Y packing (obtained from Sulzer Brothers Limited, CH-8401 Winterthur, Switzerland) at pressures of less than or equal to about 2 bars. This structured packing as well as any mentioned in this patent is constructed of corrugated sheet metal. The specific area of this packing is about 750 m²/m³ and it has flow channels oriented at an angle of about 45°. Along this curve, for a given liquid rate, the vapor rate is fixed. If the vapor rate were increased above that given by the curve, the packing would be in a flooded state, that is the ascending vapor phase within the packing would entrain a significant portion of the descending liquid phase or, in the extreme case, the ascending vapor phase would prevent the liquid phase from descending through the packing. Approximate equations of this curve are $C_v = \exp[-4.064 - 0.595 \ln \Psi - 0.0485 (\ln \Psi)^2]$ when $\Psi$ is within a range of between about 0.01 and about 0.1 and $C_v = 0.02233 \Psi^{-0.037}$ when $\Psi$ is greater than 0.1. As mentioned above, $\Psi$ is equal to $C_L/C_v$. For exemplary purposes Curves 2 and 3 present examples of Souders diagrams of 750.Y structured packing in accordance with the present invention at operational pressures of 4 and 6 bars, respectively, and for a mixture of atmospheric gases. As is evident from the two latter curves, the performance of the structured packing has increased with the increase in pressure. Approximate equations of Curve 2 are $C_v = \exp[-3.885 - 0.595 \ln \Psi - 0.0485 (\ln \Psi)^2]$ when $\Psi$ is within a range of between about 0.01 and 0.1 and $C_v = 0.0266 \Psi^{-0.372}$ when $\Psi$ is greater than 0.1. Also, Approximate equations of Curve 3 are $C_v = \exp[-3.7530 - 0.595 \ln \Psi - 0.0485 (\ln \Psi)^2]$ when $\Psi$ is within a range of between about 0.01 and about 0.1 and $C_v = 0.03033 \Psi^{-0.372}$ when $\Psi$ is greater than 0.1.

The implication of the foregoing curves is that if similar packing is operated at least at 2 bars and the mixture to be separated is one of atmospheric gases, then at a minimum it can be operated along Curve 1. As a maximum it can be operated at a critical vapor rate which is the vapor rate at which the packing or column floods. This critical vapor rate can be experimentally determined and in operational practice is taken as a value in approach to flooding conditions based upon available column control. Typically, the critical vapor rate is about 80% of the actual vapor rate at flooding. However, the upper limit of the critical vapor rate for the type of packing discussed above is curve 2 if the packing or column is operated at 4 bars and curve 3 if the packing is operated at 6 bars. Again, these results obtain where the mixture to be separated is a mixture of atmospheric gases, the packing is fabricated from corrugated sheet metal, and the flow channel angle is 45 degrees. As a result, the column may be designed to operate at a greater throughput than a prior art column or may be designed with a lower volume of structured packing than would have been used on the basis of prior art designs.

Applicants have found similar improvements for other structured packing (formed of corrugated sheet metal, operating at above 2 bars absolute, and used in atmospheric gas separations) having other packing densities and other flow channel angles than those of 750.Y type structured packing. For instance where the specific area of the structured packing is within a range of between about 100 m²/m³ and about 450 m²/m³ and flow channels oriented at an angle of between about 30 degrees and about 45 degrees. At a minimum, the column can be operated so that the vapor rate through such packing will be equal to about $\exp[-0.0485(\ln \Psi)^2 - 0.595 \ln \Psi - 3.176 - 0.00169A]$ when $\Psi$ is within the range of about 0.01 and 0.1 and to about $0.054 e^{-0.00169A} \Psi^{-0.372}$ when $\Psi$ is greater than 0.1. For structured packing having a specific area within a range of between about 450 m²/m³ and about 1000 m²/m³ and flow channels oriented at an angle of about between about 30 degrees and 45 degrees, the column can be operated at a minimum vapor rate through such packing of about $\exp[-0.0485(\ln \Psi)^2 - 0.595 \ln \Psi - 3.748 - 0.000421A]$ when $\Psi$ is within the foregoing range and to about $0.0305 e^{-0.000421A} \Psi^{-0.372}$ when $\Psi$ is greater than 0.1. For structured packing having a specific area within a range of between about 170 m²/m³ and about 250 m²/m³ and flow channels oriented at an angle of about 30 degrees or less, a minimum vapor rate for the column can be taken as about $\exp[-0.0485(\ln \Psi)^2 - 0.595 \ln \Psi - 2.788 - 0.00236A]$ when $\Psi$ is within the foregoing range and to about $0.0305 e^{-0.00236A} \Psi^{-0.372}$ when $\Psi$ is greater than 0.1. Lastly, for structured packing having a specific area within a range of between about 250 m²/m³ and about 1000 m²/m³ and flow channels oriented at an angle of about 30 degrees or less, a minimum vapor rate from the column can be set equal to about $\exp[-0.0485(\ln \Psi)^2 - 0.595 \ln \Psi - 3.156 - 0.000893A]$ when $\Psi$ is within the range and to about $0.0551 e^{-0.000893A} \Psi^{-0.372}$ when $\Psi$ is greater than 0.1. In all of the foregoing quantities, A is the specific area of the packing in m²/m³.

Applicants have also found that in addition to the performance with respect to liquid and vapor rates, the separation performance of structured packing increases with column pressure. At pressures in a range of between about 3.5 bar and about 7.5 bar, that the HETP (Height Equivalent of a Theoretical Plate) for 750.Y packing is approximately equal to 0.181 added to a product of −0.00864 and the pressure. For pressures in a range of between about 7.5 bar and about 20 bar, HETP has been found to be about 0.116 meters. Therefore, for a given separation, the number of required theoretical stages multiplied by the foregoing HETP values will produce a desired height of packing. In the prior art, HETP was thought to increase with the increase of pressure. It can be seen that in the present invention, HETP decreases with increasing pressure and then levels off at a constant where the mixture to be separated is one containing atmospheric gases.

Figure 2:
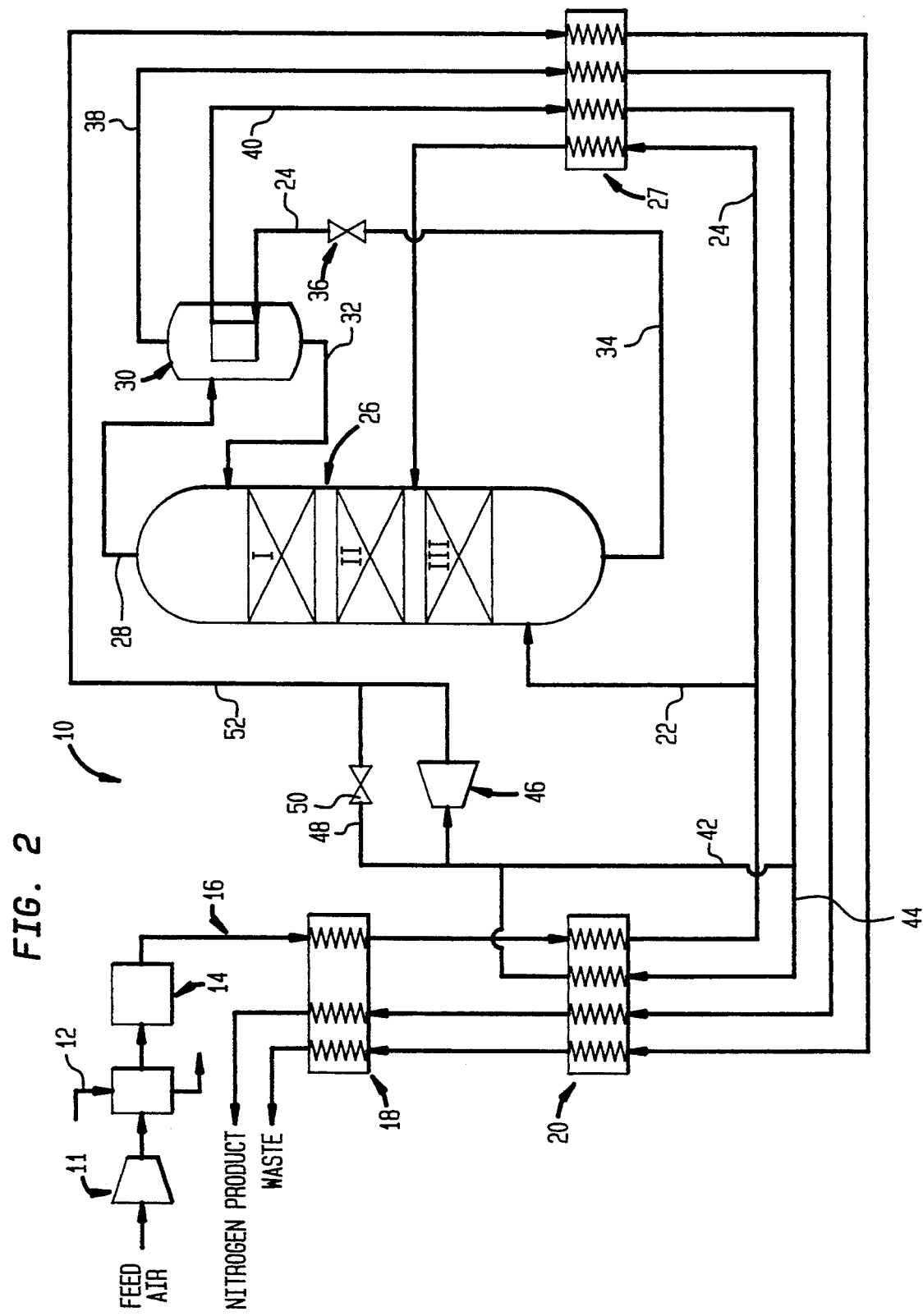
FIG. 2 is the distillation column system designed in accordance with the present invention.

With reference to FIG. 2, a distillation column system 10 is illustrated. It is understood, however, that the present invention is equal applicability to other types of distillation column systems, for instance, double column systems having high and low pressure columns to produce nitrogen and oxygen products, three column systems for argon production and etc.

In distillation column system 10, feed air is compressed in a compressor 11 and the heat of compression produced by compressor 11 is removed by an after cooler 12. The air is then fed into a pre-purification unit 14 which can consist of two or more adsorbent beds operating out of phase to adsorb carbon dioxide, water, and hydrocarbons. Resultant air stream 16 is cooled in sections 18 and 20 of the main heat exchanger to at or near its dew point and divided into two subsidiary air streams 22 and 24. Subsidiary air stream 22 is introduced into the bottom of a distillation column 26 for refinement. Subsidiary airstream 24 is subcooled within a subcooler 27 and is then introduced as a liquid into an appropriate intermediate stage of distillation column 26.

An ascending vapor phase is created within distillation column 26 through the introduction of subsidiary air stream 22. The descending liquid phase is created by removing a nitrogen vapor tower overhead stream 28 and condensing nitrogen vapor tower overhead stream 28 within a head condenser 30 to produce a reflux stream 32. Reflux stream 32 is returned in part back to distillation column 26. A column bottom stream 34 is extracted from distillation column 26 and is expanded to a low-temperature and pressure via Joule-Thompson (J-T) valve 36. The expanded column bottom stream 34 is then passed into head condenser 30 to condense nitrogen vapor tower overhead stream 28. A product stream 38, containing high purity nitrogen, is partially warmed within subcooler 27 (warmed to a temperature between distillation column operating temperature and the cold end of the main heat exchanger) and is then fully warmed within sections 18 and 20 of the main heat exchanger. The vaporized column bottom stream, designated by reference numeral 40 is partially warmed within subcooler 27 and then is fully warmed within sections 18 and 20 of the main heat exchanger.

As with all cryogenic air separation plants, heat leakage into the plant requires the generation of refrigeration. In the present embodiment, stream 40 is divided into two partial streams 42 and 44. Partial stream 44 is partially warmed within section 20 of the main heat exchanger and then is combined with partial stream 42. The combined stream is then fed into a turboexpander 46. Stream 48 is bled off from the combined stream being fed into turboexpander 46 and is expanded in a Joule-Thompson (J-T) valve 50. Stream 48 after expansion is combined with an expanded stream discharged from the exhaust of turboexpander 46 to produce a refrigerant stream 52. Refrigerant stream 52 partially warms within subcooler 27 and fully warms within sections 18 and 20 of the main heater exchanger to lower the enthalpy of the incoming air.

The following table is a calculated example of a possible operation of a distillation column system 10.

| Stream | Temperature (K) | Pressure (bar) | Flow Rate (kg/hr) | Composition (Mole %) |
| --- | --- | --- | --- | --- |
| Air stream 16 after Pre-purification Unit 14 | 302.60 | 6.00 | 4,449.66 | 78.11% $N_2$<br>20.96% $O_2$<br>0.93% Ar |
| Air stream 16 after section 18 of the Main Heat Exchanger | 152.77 | 6.00 | 4,449.66 | 78.11% $N_2$<br>20.96% $O_2$<br>0.93% Ar |
| Air stream 16 after section 20 of the Main Heat Exchanger | 102.84 | 6.00 | 4,449.66 | 78.11% $N_2$<br>20.96% $O_2$<br>0.93% Ar |
| Subsidiary Air Stream 22 | 102.84 | 6.00 | 4,307.11 | 78.11% $N_2$<br>20.96% $O_2$<br>0.93% Ar |
| Subsidiary Air Stream 24 before Subcooler 27 | 102.84 | 6.00 | 142.55 | 78.11% $N_2$<br>20.96% $O_2$<br>0.93% Ar |
| Subsidiary Air Stream 24 after Subcooler 28 | 98.61 | 6.00 | 142.55 | 78.11% $N_2$<br>20.96% $O_2$<br>0.93% Ar |
| Column Bottom Stream 34 | 100.83 | 6.00 | 2,429.01 | 59.04% $N_2$<br>39.46% $O_2$<br>1.50% Ar |
| Column Bottom Stream 34 after J-T Valve 36 | 90.00 | 2.50 | 2,429.01 | 59.04% $N_2$<br>39.46% $O_2$<br>1.50% Ar |
| Product Stream 38 | 96.14 | 5.87 | 2,020.64 | 99.72% $N_2$<br>0.28% $O_2$<br>0.00% Ar |
| Product Stream 38 after Subcooler 27 | 101.84 | 5.87 | 2,020.64 | 99.72% $N_2$<br>0.28% $O_2$<br>0.00% Ar |
| Product Stream 38 after section 20 of the Main Heat Exchanger | 148.68 | 5.87 | 2,020.64 | 99.72% $N_2$<br>0.28% $O_2$<br>0.00% Ar |
| Product Stream 38 after section 18 of the Main Heat Exchanger | 300.08 | 5.87 | 2,020.64 | 99.72% $N_2$<br>0.28% $O_2$<br>0.00% Ar |
| Rich Liquid Vapor Stream 40 before Subcooler 27 | 93.31 | 2.50 | 2,429.01 | 59.04% $N_2$<br>39.46% $O_2$<br>1.5% Ar |
| Rich Liquid Vapor Stream 40 after Subcooler 27 | 101.84 | 2.50 | 2,429.01 | 59.04% $N_2$<br>39.46% $O_2$<br>1.5% Ar |
| Partial Stream 44 | 101.84 | 2.50 | 502.58 | 59.04% $N_2$<br>39.46% $O_2$<br>1.5% Ar |
| Partial Stream 42 | 101.84 | 2.50 | 1,926.44 | 59.04% $N_2$<br>39.46% $O_2$<br>1.5% Ar |
| Partial Stream 44 after having been partially warmed within | 146.68 | 2.50 | 502.58 | 59.04% $N_2$<br>39.46% $O_2$ |

| Stream | Temperature (K) | Pressure (bar) | Flow Rate (kg/hr) | Composition (Mole %) |
|---|---|---|---|---|
| section 20 of the Main Heat Exchanger | | | | 1.5% Ar |
| Combination of Streams 42 and 44 fed to Turboexpander 46 | 111.38 | 2.50 | 448.73 | 59.04% $N_2$ 39.46% $O_2$ 1.5% Ar |
| Stream 48 fed to J-T Valve 50 | 111.38 | 2.50 | 1,980.28 | 59.04% $N_2$ 39.46% $O_2$ 1.5% Ar |
| Combination of Streams 42 and 44 after Turboexpander 46 | 91.68 | 1.02 | 448.73 | 59.04% $N_2$ 39.46% $O_2$ 1.5% Ar |
| Stream 48 after J-T Valve 50 | 109.33 | 1.02 | 1,980.28 | 59.04% $N_2$ 39.46% $O_2$ 1.5% Ar |
| Refrigerant Stream 52 | 106.05 | 1.02 | 2,429.01 | 59.04% $N_2$ 39.46% $O_2$ 1.5% Ar |
| Refrigerant Stream 52 after Subcooler 28 | 101.80 | 1.02 | 2,429.01 | 59.04% $N_2$ 39.46% $O_2$ 1.5% Ar |
| Refrigerant Stream 52 after section 18 of the Main Heat exchanger | 146.68 | 1.02 | 2,429.01 | 59.04% $N_2$ 39.46% $O_2$ 1.5% Ar |
| Refrigerant Stream 52 after section 20 of the Main Heat Exchanger | 300.08 | 1.02 | 2,429.01 | 59.04% $N_2$ 39.46% $O_2$ 1.5% Ar |

Distillation column 26 uses three sections of structured packing designated as I, II, and III. In this example, packing having a density of 750 m²/m³ is used in forming the sections and such packing can be 750.Y structured packing obtained from Sulzer Brothers Limited. In the design, Stage I has approximately 27 theoretical stages, Stage II has about 26 theoretical stages, and Stage III has about 6 theoretical stages. The following chart is the performance of each of the sections and a calculation of $C_L$, and packing height in accordance with the present invention.

The following is a chart of column performance of distillation column 26 designed with a $C_v$ flooding limit in accordance with the prior art.

| | STAGE I | | STAGE II | | STAGE III | |
|---|---|---|---|---|---|---|
| | TOP | BOTTOM | TOP | BOTTOM | TOP | BOTTOM |
| $\rho_L$ (kg/m³) | 714.6 | 771.2 | 771.2 | 820.1 | 822.4 | 836.8 |
| $\rho_L$ (kg/m³) | 24.26 | 24.80 | 24.780 | 24.19 | 24.19 | 24.06 |
| L (m³/hr) | 3.528 | 3.333 | 3.333 | 2.909 | 3.065 | 2.903 |
| V (m³/hr) | 187.2 | 185.2 | 185.2 | 182.3 | 182.3 | 181.5 |
| $C_L$ (m/s) | 0.005784 | 0.005459 | 0.005459 | 0.004758 | 0.005013 | 0.004746 |
| $C_V$ (m/s) | 0.05655 | 0.05438 | 0.05438 | 0.05118 | 0.05112 | 0.05032 |
| $\Psi$ ($C_L/C_v$) | 0.1023 | 0.1004 | 0.1004 | .09300 | 0.09806 | 0.09433 |
| $C_v$ Flood | 0.05184 | 0.05220 | 0.05220 | 0.05370 | 0.05263 | 0.05342 |
| $C_v$ Design | 0.04147 | 0.04176 | 0.04176 | 0.04296 | 0.04213 | 0.04274 |
| % Flood | 80.02 | 76.41 | 76.41 | 69.91 | 71.21 | 69.1 |
| HETP | 0.193 | 0.193 | 0.193 | 0.193 | 0.193 | 0.193 |
| Height (m) | 5.21 | — | 5.02 | — | 1.16 | — |

If the foregoing two charts are compared, the maximum vapor rate, that is the vapor rate at flooding is greater in a distillation column operated in accordance with the present invention over the prior art on the basis of a section by section comparison. Also, the HETP is less in a distillation column operated in accordance with the present invention over one of the prior art in each section of the distillation column. As mentioned previously these advantages can be realized in either a greater throughput for a given volume of structured

| | STAGE I | | STAGE II | | STAGE III | |
|---|---|---|---|---|---|---|
| | TOP | BOTTOM | TOP | BOTTOM | TOP | BOTTOM |
| $\rho_L$ (kg/m³) | 714.6 | 771.2 | 771.2 | 820.1 | 822.4 | 836.8 |
| $\rho_L$ (kg/m³) | 24.26 | 24.80 | 24.80 | 24.19 | 24.19 | 24.06 |
| L (m³/hr) | 3.528 | 3.333 | 3.333 | 2.909 | 3.065 | 2.903 |
| V (m/hr) | 187.2 | 185.2 | 185.2 | 182.3 | 182.3 | 181.5 |
| $C_L$ (m/s) | 0.005784 | 0.005459 | 0.005459 | 0.004758 | 0.005013 | 0.004746 |
| $C_V$ (m/s) | 0.05655 | 0.05438 | 0.05438 | 0.05118 | 0.05112 | 0.05032 |
| $\Psi$ ($C_L/C_v$) | 0.1023 | 0.1004 | 0.1004 | .0930 | 0.09806 | 0.09433 |
| $C_v$ Flood | .07067 | 0.07116 | 0.07116 | 0.07239 | 0.07187 | 0.07291 |
| $C_v$ Design | 0.05654 | 0.05693 | 0.05693 | 0.05864 | 0.05750 | 0.05833 |
| % Flood | 80.02 | 76.41 | 76.41 | 69.82 | 71.13 | 69.02 |
| HETP | 0.130 | 0.130 | 0.130 | 0.130 | 0.130 | 0.130 |
| Height (m) | 3.5 | — | 3.37 | — | 0.78 | — | packing or a decrease in the volume of the structured packing for a given column performance. Here it is appropriate to note the inclusion of the "$C_v$ design" and "% flood" columns of the above tables. These figures are given because distillation columns are generally not operated at flooding. Rather they are designed and operated on an approach to flooding basis which can be at a $C_v$ of about 80% of flooding. It also should be mentioned that the terms "L" and "V" are the average liquid and vapor volumetric flow rates.

Assuming the required performance of FIG. 1, the following table summarizes the structured packing volume savings possible in a distillation column 26 designed to operated in accordance with the present invention over a prior art operation of distillation column 26.

| Equipment Sizes: | Prior Art | Invention |
|---|---|---|
| column diameter (m) | 0.55 | 0.47 |
| column area (m$^2$) | 0.24 | 0.17 |
| packed height (m) | 11.39 | 7.64 |
| packed volume (m$^3$) | 2.68 | 1.31 |
| HETP (cm) | 19.30 | 13.00 |
| Relative to Prior Art: | | |
| column diameter | 100% | 85.6% |
| cross sectional area | 100% | 73.4% |
| packed height | 100% | 67.0% |
| packed volume | 100% | 48.8% |

As can be seen from the above table, roughly half the packing need be used in a column operated and designed in accordance with the present invention over the same column operated and designed in accordance with the prior art.

While the invention has been described with reference to preferred embodiment, it will be understood by those skilled in the art that numerous additions, omissions, and changes made be made without departing from the sphere and scope of the present invention.

We claim:

1. A method of cryogenically separating a mixture of atmospheric gases within a distillation column system having at least one distillation column, said method comprising:

forming descending liquid and ascending gaseous phases of said mixture of said atmospheric gases within said at least one distillation column;

contacting said descending liquid and ascending gaseous phases of said mixture within structured packing contained within at least one section of said at least one distillation column so that said descending liquid phase becomes ever more concentrated in lower volatility components of said mixture as it descends through said structured packing while said gaseous phase becomes ever more concentrated in higher volatility components of said mixture as it ascends through said structured packing;

said structured packing being constructed of corrugated sheet metal with a specific area within a range of between about 100 m$^2$/m$^3$ and about 450 m$^2$/m$^3$ and flow channels oriented at an angle of between about 30 degrees and about 45 degrees; and operating the column so that the at least one section has a pressure of greater than about two bars, a flow parameter $\Psi$, equal to $C_L/C_v$ where $C_v$ is a vapor rate of the ascending gaseous phase and $C_L$ is a liquid rate of the descending liquid phase, of either within a flow parameter range of between about 0.01 and about 0.1 or greater than 0.1, and the vapor rate of less than a critical vapor rate at which said at least one section of said distillation column floods and greater than a minimum vapor rate equal to about $\exp[-0.0485(\ln\Psi)^2 - 0.595$ ln $\Psi - 3.176 - 0.00169A]$, where A is the specific area of said structured packing, when $\Psi$ is within said range and to about $0.054e^{-0.00169A} \Psi^{-0.372}$ when $\Psi$ is greater than 0.1.

2. A method of cryogenically separating a mixture of atmospheric gases within a distillation column system having at least one distillation column, said method comprising:

forming descending liquid and ascending gaseous phases of said mixture of said atmospheric gases within said at least one distillation column;

contacting said descending liquid and ascending gaseous phases of said mixture within structured packing contained within at least one section of said at least one distillation column so that said descending liquid phase becomes ever more concentrated in lower volatility components of said mixture as it descends through said structured packing while said gaseous phase becomes ever more concentrated in higher volatility components of said mixture as it ascends through said structured packing;

said structured packing being constructed of corrugated sheet metal with a specific area within a range of between about 450 m$^2$/m$^3$ and about 1000 m$^2$/m$^3$ and flow channels oriented at an angle of between about 30 degrees and about 45 degrees; and operating the column so that the at least one section has a pressure of greater than about two bars, a flow parameter $\Psi$, equal to $C_L/C_v$ where $C_v$ is a vapor rate of the ascending gaseous phase and $C_L$ is a liquid rate of the descending liquid phase, of either within a flow parameter range of between about 0.01 and about 0.1 or greater than 0.1, and the vapor rate of less than a critical vapor rate at which said at least one section of said distillation column floods and greater than a minimum vapor rate equal to about $\exp[-0.0485(\ln\Psi)^2 - 0.595$ ln $\Psi - 3.748 - 0.000421A]$, where A is the specific area of said structured packing, when $\Psi$ is within said range and to about $0.0305e^{-0.000421A} \Psi^{-0.372}$ when $\Psi$ is greater than 0.1.

3. A method of cryogenically separating a mixture of atmospheric gases within a distillation column system having at least one distillation column, said method comprising:

forming descending liquid and ascending gaseous phases of said mixture of said atmospheric gases within said at least one distillation column;

contacting said descending liquid and ascending gaseous phases of said mixture within structured packing contained within at least one section of said at least one distillation column so that said descending liquid phase becomes ever more concentrated in lower volatility components of said mixture as it descends through said structured packing while said gaseous phase becomes ever more concentrated in higher volatility components of said mixture as it ascends through said structured packing;

said structured packing being constructed of corrugated sheet metal with a specific area within a range of between about 170 m$^2$/m$^3$ and about 250 m²/m³ and flow channels oriented at an angle of about 30 degrees or less; and operating the column so that the at least one section has a pressure of greater than about two bars, a flow parameter $\Psi$, equal to $C_L/C_v$ where $C_v$ is a vapor rate of the ascending gaseous phase and $C_L$ is a liquid rate of the descending liquid phase, of either within a flow parameter range of between about 0.01 and about 0.1 or greater than 0.1, and the vapor rate of less than a critical vapor rate at which said at least one section of said distillation column floods and greater than a minimum vapor rate equal to about $\exp[0.0485(\ln\Psi)^2 - 0.595 \ln \Psi - 2.788 - 0.00236A]$, where A is the specific area of said structured packing, when $\Psi$ is within said range and to about $0.0796e^{-0.00236A}\Psi^{-0.372}$ when $\Psi$ is greater than 0.1.

4. A method of cryogenically separating a mixture of atmospheric gases within a distillation column system having at least one distillation column, said method comprising:

forming descending liquid and ascending gaseous phases of said mixture of said atmospheric gases within said at least one distillation column;

contacting said descending liquid and ascending gaseous phases of said mixture within structured packing contained within at least one section of said at least one distillation column so that said descending liquid phase becomes ever more concentrated in lower volatility components of said mixture as it descends through said structured packing while said gaseous phase becomes ever more concentrated in higher volatility components of said mixture as it ascends through said structured packing;

said structured packing being constructed of corrugated sheet metal with a specific area within a range of between about 250 m²/m³ and about 1000 m²/m³ and flow channels oriented at an angle of about 30 degrees or less; and operating the column so that the at least one section has a pressure of greater than about two bars, a flow parameter $\Psi$, equal to $C_L/C_v$ where $C_v$ is a vapor rate of the ascending gaseous phase and $C_L$ is a liquid rate of the descending liquid phase, of either within a flow parameter range of between about 0.01 and about 0.1 or greater than 0.1, and the vapor rate of less than a critical vapor rate at which said at least one section of said distillation column floods and greater than a minimum vapor rate equal to about $\exp[-0.0485(\ln\Psi)^2 - 0.595 \ln \Psi - 3.156 - 0.000893A]$, where A is the specific area of said structured packing, when $\Psi$ is within said range and to about $0.05515e^{-0.000893A}\Psi^{-0.372}$ when $\Psi$ is greater than 0.1.

5. The method of claim 2, wherein:
said structured packing has a packing density of about 750 m²/m³, and has flow channels oriented at an angle of about 45 degrees;
said at least one section has a pressure equal to about 4 bars; and
said critical vapor rate is equal to about $\exp[-0.0485(\ln\Psi)^2 - 0.595 \ln \Psi - 3.885]$, when $\Psi$ is within said range and to about $0.0266\Psi^{-0.372}$ when $\Psi$ is greater than 0.1.

6. The method of claim 2, wherein:
said structured packing has a packing density of about 750 m²/m³ and has flow channels oriented at an angle of about 45 degrees;

said at least one section has a pressure equal to about 6 bars; and
said critical vapor rate is equal to about $\exp[-0.0485(\ln\Psi)^2 - 0.595 \ln \Psi - 3.753]$, when $\Psi$ is within said range and to about $0.03033\Psi^{-0.372}$ when $\Psi$ is greater than 0.1.

7. The method of claim 2, wherein:
said structured packing has a packing density of about 750 m²/m³ and has flow channels oriented at an angle of about 45 degrees;
said pressure is within a range of between about 3.5 bars and about 7.5 bars; and
said liquid and gaseous phases of said mixture are contacted through a height of said structured packing in said at least one section of said distillation column such that said liquid and gaseous phases respectively contain lower and higher volatility components of said mixture in predetermined concentrations of said lower and higher volatility components and said height of the structured packing is about equal to a product of a number of theoretical stages required to produce said predetermined concentrations of said lower and higher volatility components and a quantity equal to a sum of 0.181 added to said pressure multiplied by $-0.00864$.

8. The method of claim 2, wherein:
said structured packing has a packing density of about 750 m²/m³ and has flow channels oriented at an angle of about 45 degrees;
said pressure is within a range of between about 7.5 bars and about 20 bars; and
said liquid and gaseous phases of said mixture are contacted through a height of said structured packing in said at least one section of said distillation column such that said liquid and gaseous phases respectively contain lower and higher volatility components of said mixture in predetermined concentrations of said lower and higher volatility components and said height of the structured packing is about equal to a product of a number of theoretical stages required to produce said predetermined concentrations of said lower and higher volatility components and 0.116.

9. A method of cryogenically separating a mixture of atmospheric gases within a distillation column system having at least one distillation column, said method comprising:

operating said distillation column at a pressure within a range of between about 3.5 bars and about 7.5 bars;

forming descending liquid and ascending gaseous phases of said mixture of said atmospheric gases within said at least one distillation column; and contacting said descending liquid and ascending gaseous phases of said mixture within structured packing contained within at least one section of said at least one distillation column and having a packing density of about 750 m²/m³ and having flow channels oriented at an angle of about 45 degrees so that said descending liquid phase becomes ever more concentrated in lower volatility components of said mixture as it descends through said structured packing while said gaseous phase becomes ever more concentrated in higher volatility components of said mixture as it ascends through said structured packing;

said liquid and gaseous phases of said mixture of atmospheric gases being contacted through a height of said structured packing such that said liquid and gaseous phases respectively contain lower and higher volatility components of said mixture in predetermined concentrations and said height of the structured packing in meters is approximately equal to a product of a number of theoretical stages required to produce said predetermined concentrations of said lower and higher volatility components and a quantity equal to a sum of 0.181 added to said pressure multiplied by −0.00864.

10. A method of cryogenically separating a mixture of atmospheric gases within a distillation column system having at least one distillation column, said method comprising:

operating said distillation column at a pressure within a range of between about 7.5 bars and about 20 bars;

forming descending liquid and ascending gaseous phases of said mixture of said atmospheric gases within said at least one distillation column; and contacting said descending liquid and ascending gaseous phases of said mixture within structured packing contained within at least one section of said at least one distillation column and having a packing density of about 750 $m^2/m^3$ and having flow channels oriened at an angle of about 45 degrees so that said descending liquid phase becomes ever more concentrated in lower volatility components of said mixture as it descends through said structured packing while said gaseous phase becomes ever more concentrated in higher volatility components of said mixture as it ascends through said structured packing, thereby to effect said cryogenic separation;

said liquid and gaseous phases of said mixture of atmospheric gases being contacted through a height of said structured packing such that said liquid and gaseous phases respectively contain lower and higher volatility components of said mixture in predetermined concentrations and said height of the structured packing in meters is approximately equal to a product of a number of theoretical stages required to produce said predetermined concentrations of said lower and higher volatility components and 0.116.

* * * * *